July 27, 1937.   O. CARLSON   2,088,259
CHILD'S VEHICLE
Filed July 19, 1935   2 Sheets-Sheet 2
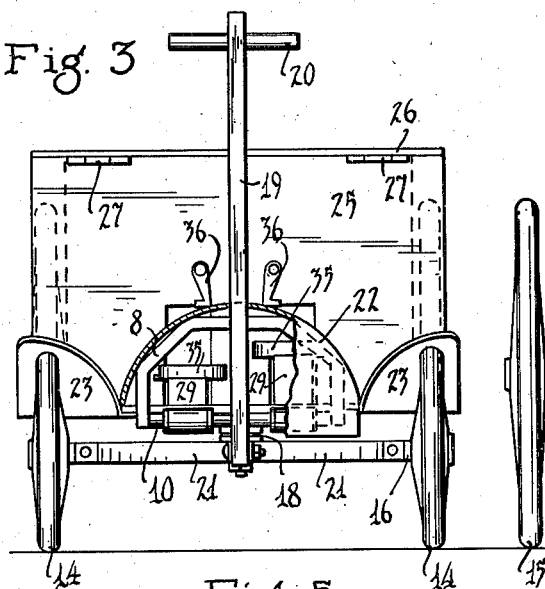
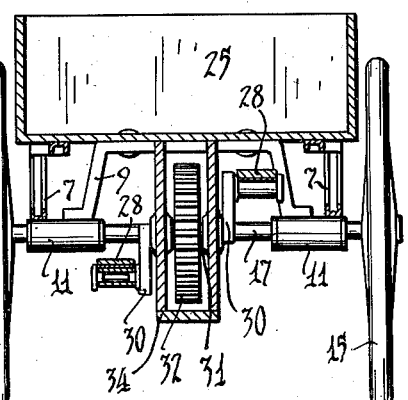
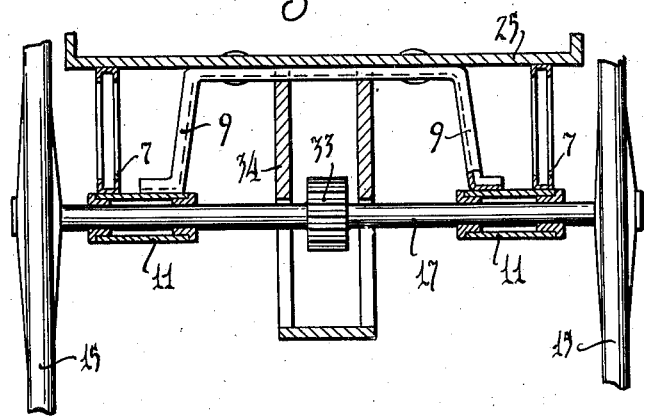
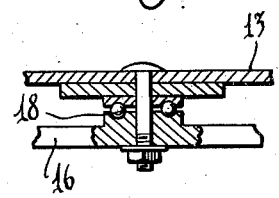
INVENTOR
Oscar Carlson
BY HIS ATTORNEYS Patented July 27, 1937

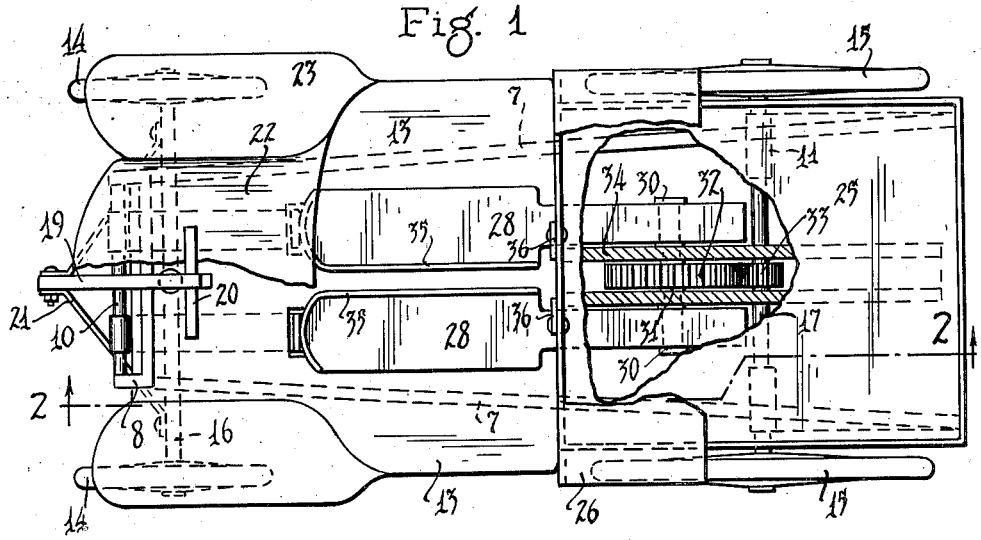

2,088,259

UNITED STATES PATENT OFFICE 2,088,259

CHILD'S VEHICLE

Oscar Carlson, Minneapolis, Minn., assignor of one-half to Robert E. Morrissey, Minneapolis, Minn.

Application July 19, 1935, Serial No. 32,195

9 Claims. (Cl. 208—34)

My present invention relates to a child's vehicle and has for its object the provision of a vehicle having either two, three or four wheels and in which vehicle is embodied all of the features of a wagon, a coaster, and a scooter. The improved vehicle may be drawn by hand or propelled by foot power. The invention, as shown and described, is a four wheel wagon.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the wagon with some parts broken away and other parts sectioned;

Fig. 2 is a view partly in left hand elevation and partly in longitudinal vertical section taken on the irregular line 2—2 of Fig. 1, some parts being shown in different positions by means of broken lines;

Fig. 3 is a front end elevation of the wagon with a portion of the hood broken away and sectioned;

Fig. 4 is a view partly in elevation and partly in transverse vertical section taken on the line 4—4 of Fig. 2; and Figs. 5 and 6 are fragmentary detail views partly in elevation and partly in transverse vertical section taken on the lines 5—5 and 6—6 of Fig. 2, respectively, on an enlarged scale.

The frame of the wagon comprises a pair of longitudinal sills 7, an arched front cross-tie member 8, an arched rear cross-tie member 9, a transverse shaft 10, which connects the two ends of the front cross-tie member 8, and a pair of axially aligned sleeve bearings 11 which rigidly connect the ends of the rear cross-tie member 9 to the rear ends of the sills 7. Said sills 7 have upright intermediate sections 12 which support the rear sections of the sills 7 above the front section thereof. The rear end portions of the sills 7 are bent under the raised sections thereof in downwardly and forwardly inclined positions, see Fig. 2.

A platform 13 is mounted on the sills 7 and extends from the front end of said sills to the upright intermediate sill sections 12. The frame is supported on a pair of front wheels 14 and a pair of rear wheels 15, the former of which is journaled on a front axle 16 and the latter of which is fixed to a rear axle 17. The front axle 16 is pivotally attached to the platform 13 by a center roller bearing 18 and the rear axle is journaled in the bearings 11.

A tongue 19 having a handle 20 is pivotally attached to the front axle 16 by a pair of hounds 21. Covering the front portion of the platform 13 is a hood 22 to which are fixed fenders 23 for the front wheels 14.

The wagon may be drawn and steered by the tongue 19 when in substantially horizontal position, as shown by broken lines in Fig. 2, or, said wagon may be steered by a person riding thereon when the tongue 19 is turned into an upright position against the front end of the hood 22, as shown by full lines in Fig. 2. A hook 24 detachably connects the tongue 19 to the hood 22 when in an upright position with sufficient play to permit the required steering movement of the front axle 16.

Mounted on the raised rear sections of the sills 7 is an open box 25 on which loosely rests a seat 26. This seat 26 is hinged at 27 to the front end of the box 25 for swinging movement into a depending inoperative position, as shown by broken lines in Fig. 2.

Foot-operated mechanism is provided for rotating the rear axle 17 to drive the vehicle. This mechanism includes a pair of foot pedals 28, the front ends of which are fulcrumed on the shaft 10. The rear end portions of the foot pedals 28 project through apertures in the front end of the box 25, which extends to the platform 13, and under said box. These foot pedals 28 have upright intermediate sections 29 which work in apertures in the platform 13 with the front sections of the foot pedals 28 extending under the platform 13 and the rear sections thereof extending above the platform 13. The rear end portions of the foot pedals 28, which extend under the box 25, loosely rest on a pair of diametrically opposite cranks 30 on the ends of a short shaft 31 to which is fixed a large gear 32. This gear 32 meshes with a pinion 33 fixed to the shaft 31. Said shaft 31 is journaled in the side plates of a housing 34 attached to the inner side of the box 25 for the gear 32 and pinion 33. The foot pedals 28 are provided with foot guards 35.

It is important to note that the pedals 28 are at the transverse center of the platform 13 with sufficient space outwardly thereof for a person to stand on said platform.

As previously stated, the foot pedals 28 loosely rest on the cranks 30 and may be moved into inoperative positions and thus held by hooks 36 on the front end of the box 25.

From what has been said, it will be understood that the vehicle described is capable of modifications as to details of construction and arrangement within the scope of the invention herein disclosed and claimed.

What I claim is:

1. In a vehicle of the class described, a frame, front and rear wheels journaled on the frame, the former for steering movement, means for steering the front wheel, means for rotating the rear wheel including a pair of foot pedals fulcrumed on the frame, a platform on the frame outwardly of the pedals, a box on the frame, and a seat loosely supported on the box and hinged thereto for movement into a depending vertical inoperative position at the front of the box.

2. In a vehicle of the class described a frame, front and rear wheels journaled on the frame, the former for steering movement, means for steering the front wheel, means for rotating the rear wheel including a pair of foot pedals fulcrumed on the frame, a pair of cranks on which the pedals loosely rest with freedom for movement into inoperative positions, and means for holding the pedals in inoperative positions.

3. In a vehicle of the class described a frame comprising a pair of longitudinal sills, an arched front cross-tie member and an arched rear cross-tie member, a transverse shaft secured to the ends of the front cross-tie member, a front axle pivoted to a part on the frame, a pair of front wheels journaled on the front axle, a tongue attached to the front axle, a pair of axially aligned bearings on the sill and rear cross-tie member, a rear axle journaled in the bearings, a pair of rear wheels fixed to the rear axle, and means for rotating the rear axle including a pair of cranks and a pair of foot pedals fulcrumed on the shaft for action on the cranks.

4. In a vehicle of the class described a frame comprising a pair of longitudinal sills, an arched front cross-tie member and an arched rear cross-tie member, a transverse shaft secured to the ends of the front cross-tie member, a front axle pivoted to a part on the frame, a pair of front wheels journaled on the front axle, a tongue attached to the front axle, a pair of axially aligned bearings on the sill and rear cross-tie member, a rear axle journaled in the bearings, a pair of rear wheels fixed to the rear axle, means for rotating the rear axle including a pair of cranks and a pair of foot pedals fulcrumed on the shaft for action on the cranks, a platform on the sills forward of the rear wheels, the sills rearward of the platform being upwardly offset, a box on the upwardly offset portions of the sills, and a seat hinged to the box for downwardly folding movement in front of the box.

5. In a vehicle of the class described, a frame including a pair of longitudinal sills, an arched front cross-tie member and an arched rear cross-tie member, a transverse shaft secured to the ends of the front cross-tie member, said sills having intermediate upright sections whereby the rear portions of the sills are above the front portions thereof, the rear end portions of the sills being turned forwardly and downwardly, a pair of axially aligned bearings connecting the ends of the rear cross-tie member to the rear ends of the sills, a platform on the front portions of the sills, a box on the raised rear portions of the sills, a front axle pivoted to a part on the frame, front wheels journaled on the front axle, a rear axle journaled in the bearings, rear wheels fixed to the rear axle, and means for turning the rear axle including a pair of cranks and foot pedals fulcrumed on the shaft for action on the cranks.

6. The structure defined in claim 5 in which the foot pedals have intermediate upright sections which work in apertures in the platform with the front portions of the pedals below the platform and with the rear portions of said pedals above the same.

7. In a vehicle of the class described, a frame including a pair of longitudinal sills, an arched front cross-tie member and an arched rear cross-tie member, a transverse shaft secured to the ends of the front cross-tie member, said sills having intermediate upright sections whereby the rear portions of the sills are above the front portions thereof, the rear end portions of the sills being turned forwardly and downwardly, a pair of axially aligned bearings connecting the ends of the rear cross-tie member to the rear end of the sills, a platform on the front portions of the sills, a box on the raised rear portions of the sills, a front axle pivoted to a part on the frame, front wheels journaled on the front axle, a rear axle journaled in the bearings, rear wheels fixed to the rear axle, means for turning the rear axle including a pinion on the rear axle, a gear meshing with the pinion and having a pair of cranks, and a pair of foot pedals fulcrumed on the shaft for action on the cranks.

8. The structure defined in claim 5 which further includes a seat hinged to the box for movement from a position in which it rests on the upper edge of the box to a depending vertical position in front of the box.

9. The structure defined in claim 5 in which the foot pedals loosely rest on the cranks for movement into inoperative positions, and means on the box for holding the pedals in inoperative positions.

OSCAR CARLSON.